Figure 1:
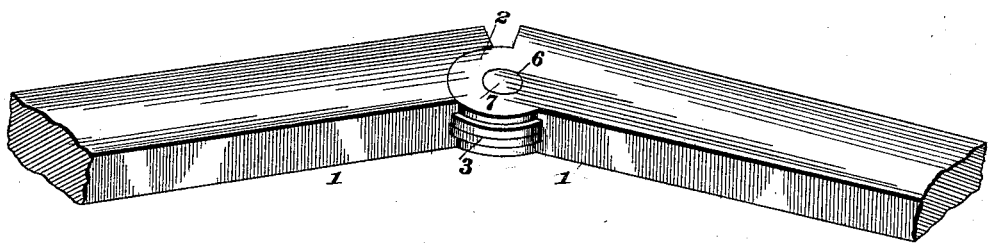

(No Model.)

J. HIGGINS.
TOP JOINT FOR VEHICLES.

No. 437,598. Patented Sept. 30, 1890.

Witnesses

Inventor
James Higgins.
By his Attorneys,
C. A. Snow & Co.

UNITED STATES PATENT OFFICE.

JAMES HIGGINS, OF GANANOQUE, CANADA.

TOP-JOINT FOR VEHICLES.

SPECIFICATION forming part of Letters Patent No. 437,598, dated September 30, 1890.

Application filed August 14, 1890. Serial No. 361,984. (No model.)

*To all whom it may concern:*

Be it known that I, JAMES HIGGINS, a citizen of the United States, residing at the town of Gananoque, in the county of Leeds and Province of Ontario, Canada, have invented a new and useful Top-Joint, of which the following is a specification.

The invention relates to improvements in top-joints.

The object of the present invention is to simplify and improve the construction of carriage-top joints and prevent the section becoming loose and wabbling or rattling.

The invention consists in the construction and novel combination and arrangement of parts hereinafter fully described, illustrated in the drawings, and pointed out in the claims hereto appended.

Figure 2:
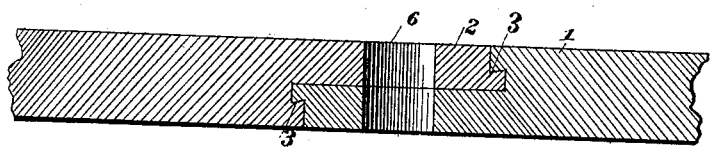
Figure 3:
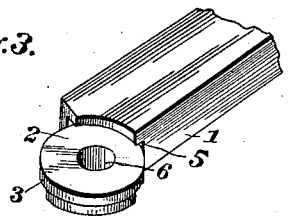

In the drawings, Figure 1 is a perspective view of a joint embodying the invention. Fig. 2 is a sectional view. Fig. 3 is a perspective view of one of the sections or parts of the joint.

Referring to the accompanying drawings, 1 designates similar sections or parts of a carriage-top joint, each of which is provided with an eye 2, having a circumferential flange 3. The flange 3 has its outer face 4 beveled from the outer edge or circumference inwardly, and the end of each section or part of the joint is provided with a dovetail groove 5, adapted to receive the beveled flange 3 of the opposite section, thereby forming a tight joint capable of preventing the part becoming loose and wabbling. The eyes 2 have their opposed faces perfectly flat, and they are provided with central openings 6, through which is arranged a pintle 7, that hinges the parts or sections together.

It will be seen that the joint is simple, strong, and durable, and is adapted to prevent the parts becoming loose and wabbling or rattling.

The grooves 5, in the ends or sections or parts, are curved, and when the sections of the joint or hinge are arranged at an angle to each other the eyes are securely clamped upon opposite sides sufficiently so to retain the section together and in proper position without the use of a pintle.

While I deem the beveled flange and groove a preferable construction, yet I do not limit myself to that, as a flat flange and groove will produce the same general result.

What I claim is—

1. A top-joint for carriages, composed of similar sections, each provided with an eye 2, having a circumferential flange, and provided with the groove adapted to receive the flange of the opposite section, substantially as described.

2. A top-joint for carriages, composed of similar sections, each provided with an eye having a beveled circumferential flange and provided with a dovetail groove adapted to receive the flange of the opposite section, substantially as described.

In testimony that I claim the foregoing as my own I have hereto affixed my signature in presence of two witnesses.

JAMES HIGGINS.

Witnesses:
   W. E. ORSER,
   W. H. BRITTON.